United States Patent
Mori

(10) Patent No.: US 7,305,248 B2
(45) Date of Patent: Dec. 4, 2007

(54) ELECTRONIC DEVICE

(75) Inventor: Ukyo Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 489 days.

(21) Appl. No.: 09/988,681

(22) Filed: Nov. 20, 2001

(65) Prior Publication Data

US 2002/0065113 A1 May 30, 2002

(30) Foreign Application Priority Data

Nov. 28, 2000 (JP) .............................. 2000-361211

(51) Int. Cl.
*H04M 1/00* (2006.01)

(52) U.S. Cl. ................. 455/550.1; 455/575.1; 455/575.8; 379/428.01; 379/433.01; 379/433.11

(58) Field of Classification Search ................. 455/566, 455/567, 350, 569.1, 149, 575.1, 550.1, 575.8; 381/111, 152, 150, 431; 379/428.01, 433.01, 379/433.11
See application file for complete search history.

(56) References Cited

U.S. PATENT DOCUMENTS

| | | | | |
|---|---|---|---|---|
| 5,872,855 A | * | 2/1999 | Porrazzo et al. | 381/400 |
| 5,999,821 A | * | 12/1999 | Kaschke | 455/575.1 |
| 6,332,029 B1 | * | 12/2001 | Azima et al. | 381/152 |
| 6,671,384 B1 | * | 12/2003 | Klein | 381/409 |

FOREIGN PATENT DOCUMENTS

| | | | |
|---|---|---|---|
| CN | 1227513 A | | 9/1999 |
| GB | 2055014 A | * | 2/1981 |
| GB | 2 330 980 A | | 5/1999 |
| GB | 2330980 A | * | 5/1999 |
| JP | 5-191335 | | 7/1993 |
| JP | 2642530 | | 5/1997 |
| JP | 2002-533957 | | 10/2002 |
| WO | WO 97/09842 | | 3/1997 |
| WO | WO 97/09859 | | 3/1997 |
| WO | WO 00/02417 | | 1/2000 |
| WO | WO 0002417 A1 | * | 1/2000 |
| WO | WO 01/74114 A2 | | 10/2001 |
| WO | WO 02/21881 A1 | | 3/2002 |

OTHER PUBLICATIONS

Japanese Office Action dated Jun. 8, 2004 (with partial English translation).

\* cited by examiner

*Primary Examiner*—Nguyen T. Vo
*Assistant Examiner*—Raymond S. Dean
(74) *Attorney, Agent, or Firm*—McGinn IP Law Group, PLLC

(57) ABSTRACT

An electronic device, in which accommodation space for a display can be extended over the space where a speaker might be provided. A portable terminal, as an example of an electronic device, is provided with a display/speaker section, an operating section, and a microphone on the front surface of its main body. The portable terminal does not have an independent speaker. A display cover located in front of the display/speaker section for protecting the display surface vibrates in response to an audio signal by a drive to output sound. Consequently, the display can be situated even over the space where a speaker might be provided.

10 Claims, 5 Drawing Sheets

F I G. 8
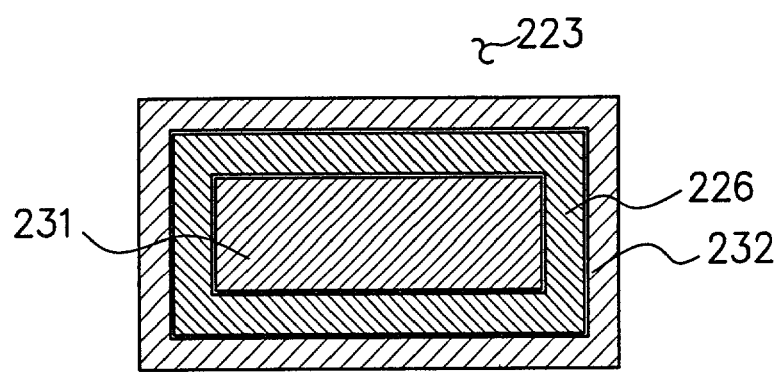
F I G. 9
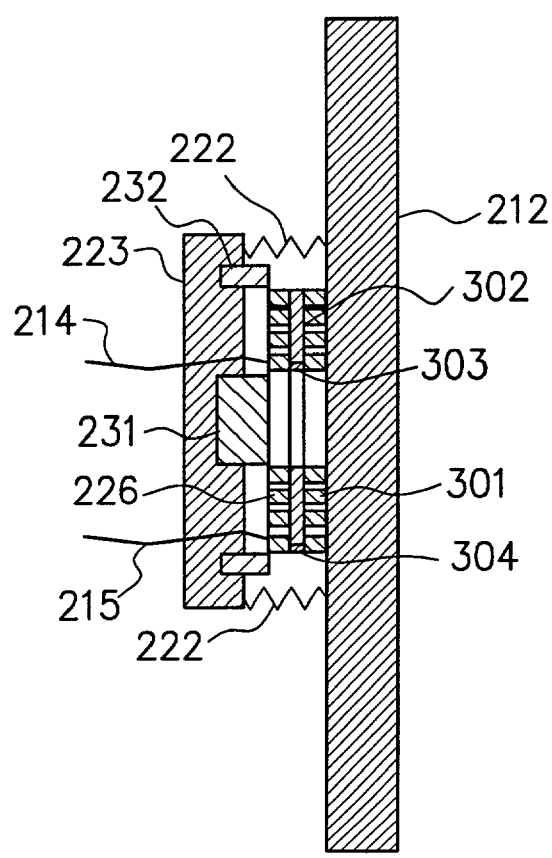

ELECTRONIC DEVICE

BACKGROUND OF THE INVENTION

The present invention relates to an electronic device that is relatively small such as a portable radio terminal, and in particular, to an electronic device comprising a speaker for audio output and a display for displaying information visually.

DESCRIPTION OF THE RELATED ART

Relatively small sized electronic devices, for example, a portable terminal etc. as typified by a cellular phone and a PHS (Personal Handyphone System) are widely used. Such electronic device is generally provided with a speaker for conversation or for giving various instructions to the device by voice, and a display for displaying visual information such as characters and images.

Japanese Patent Application Laid-Open No. HEI5-191335 discloses a card-sized electronic device. FIG. 1 illustrates the device as an example of a conventional electronic device. The electronic device 101 is provided with a liquid crystal display (LCD) 102 at the approximate center of the front surface, and keys 103 and a flat speaker 104 thereunder.

In addition, in Japanese Patent No. 2642530, there is disclosed a portable terminal that outputs audio information or image information corresponding to an ID cord from its speaker or display.

In the meanwhile, the more the device is downsized, the larger proportion of its front surface is occupied by the display part.

FIGS. 2 and 3 illustrate examples of electronic devices, which are portable terminals. The all-in-one portable terminal 111 shown in FIG. 2 is provided with a display 113 and operation keys 114 on the front surface of its main body 112. In addition, a miniature speaker 115 and a microphone 116 are disposed respectively on each end. Besides, the folding portable terminal 121 shown in FIG. 3 is provided with a display 123 and a speaker 124 at the upper side, and operation keys 125 and a microphone 126 at the lower side with a hinge connection 122 at the center.

In both examples of FIGS. 2 and 3, the data displayed by the portable terminals 111 and 121 have been changing to the higher resolution images or larger volumes often information. Consequently, it comes into question that how the portion of spaces occupied with the displays 113 and 123 is set for the relatively small-sized electronic devices under the limitation on sizes. In the actual situation, spaces for the speakers 115 and 124 are largely restricted in order to reserve the wider spaces for the displays 113 and 123.

On the other hand, in the electronic device provided with communication facilities such as the portable terminals 111 or 121, there are increasing occasions of downloading music and other various data from a server on the Internet, and accordingly, occasions of reproducing sound such as music etc. at its built-in speaker is also on the increase. In these circumstances, it is necessary to improve the sound quality of the speakers 115 and 124. Therefore, there is a limit to the miniaturization of the speakers 115 and 124, which is required to widen the displays 113 and 123.

As above, problems have been concretely pointed out with respect to the conventional portable terminal. These are commonly observed in a small-sized electronic device having a speaker and a display.

SUMMARY OF THE INVENTION

It is therefore an object of the present invention to provide an electronic device in which accommodation space of a display can be widened to the space where a speaker is disposed.

In accordance with the first aspect of the present invention, there is provided an electronic device comprising: a main body, a display disposed at a prescribed position on the main body for showing information visually, a transparent plate member provided on the surface of the display, and a driving means installed at a prescribed position on the plate member for vibrating the plate member in response to an audio signal.

That is, in the first aspect of the present invention, the transparent plate member provided on the surface of the display vibrates in response to an audio signal to output sound. Consequently, the display can be situated even over the space where a speaker is supposed to be disposed, and thus obtaining a relatively large display.

In accordance with the second aspect of the present invention, an electronic device comprises: a main body being slender in shape as a hand set, which has a microphone near the end of its front surface; a display disposed in a prescribed space, which includes a space where a speaker is disposed, near the end opposite to the microphone on the main body for showing information visually; a transparent plate member provided on the surface of the display, and a driving means installed at a prescribed position on the plate member for vibrating the plate member in response to an audio signal.

That is, in the second aspect of the present invention, the display is situated even over the space where the speaker is supposed to be disposed on the slender shape hand set, and the transparent plate member provided on the surface of the display vibrates in response to an audio signal to output sound. Consequently, a relatively large display can be obtained.

In accordance with the third aspect of the present invention, in the first or the second aspect, the driving means includes magnets and a voice coil where an audio signal is inputted, either of which is installed on the transparent plate member.

That is, in the third aspect of the present invention, the driving means for outputting sound is provided with the magnets and the voice coil. The magnets or the voice coil is installed on the transparent plate member to vibrate it, and thus enabling sound output.

In accordance with the fourth aspect of the present invention, in the first or the second aspect, the driving means are installed at plural places on the transparent plate member.

That is, in the fourth aspect of the present invention, there may be one or more driving means installed on the plate member. By installing the driving means at plural places it is possible to uprate sound output and reduce accommodation space per a driving means.

In with the fifth act of the present invention, in the first or the second aspect, the voice coil is a planar coil having a shape of a square frame. The magnets are disposed at places corresponding to both inside and outside of the frame of the voice coil on an opposite spaced surface to the surface where the voice coil is installed.

That is, in the fifth aspect of the present invention, a planar coil having a shape of a quadrilateral frame is used as the voice coil. The magnets are disposed at places corresponding to both inside and outside of the frame of the voice coil on an opposite spaced surface to the surface where the voice coil is installed, and thereby an audio signal is converted to vibrations of either/both of the surfaces.

In accordance with the sixth aspect of the present invention, in the fifth aspect, plural planar coils are built up in the direction orthogonal to the surface where the coils are installed.

That is, in the sixth aspect of the present invention, plural planar coils are built up in the direction orthogonal to the surface where the coils are installed, and thus allowing enough volume of sound to be outputted.

BRIEF DESCRIPTION OF THE DRAWINGS

The objects and features of the present invention will become more apparent from the consideration of the following detailed description taken in conjunction with the accompanying drawings in which:

FIG. 8 is a cross section view taken along the line B-B' in FIG. 6 showing a physical relationship among the planar coil, the first magnet and the second magnet; and FIG. 9 is a cross section view of a drive taken along the line A-A' in FIG. 5 according to another embodiment of the present invention.

DESCRIPTION OF THE PREFERRED EMBODIMENT

Figure 1:
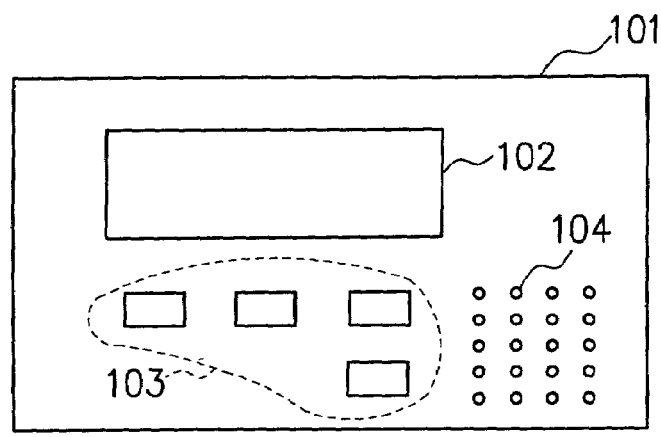
FIG. 1 is a plan view showing a conventional electronic device.

Referring now to the drawings, a description of preferred embodiments of the present invention will be given in detail.

Figure 2:
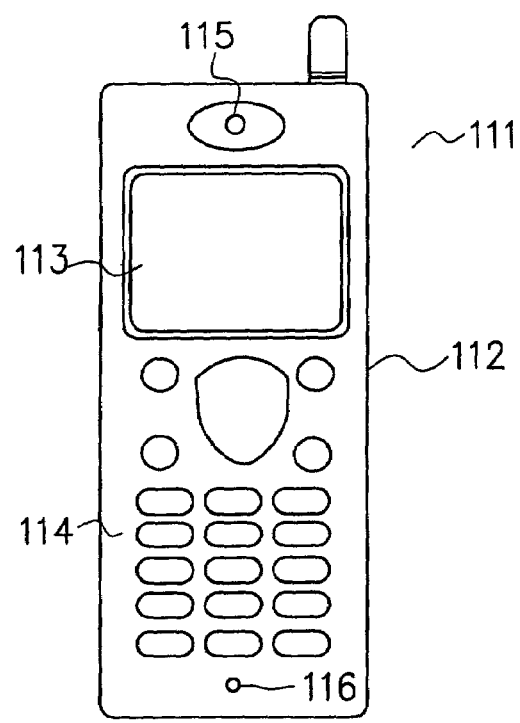
FIG. 2 is a plan view showing an example of a conventional portable terminal.
Figure 3:
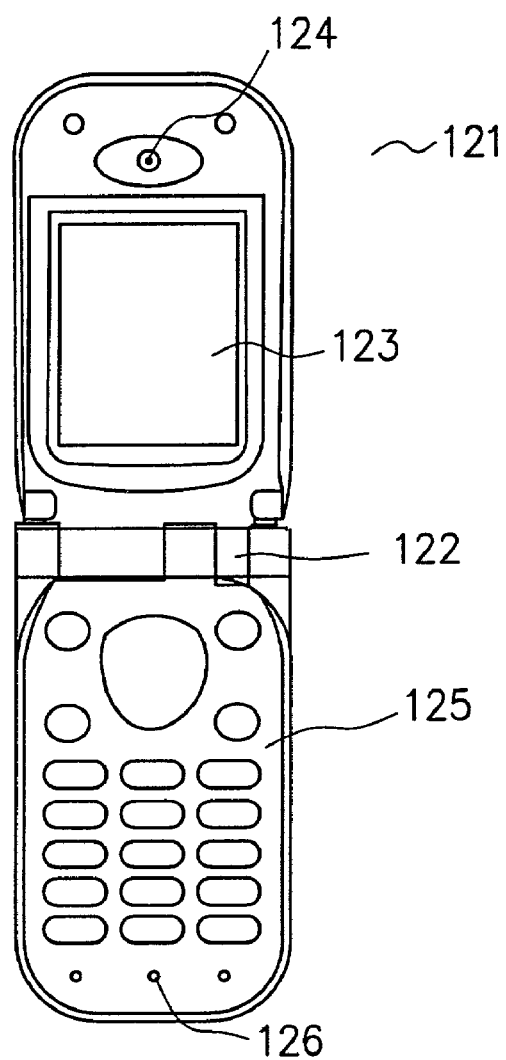
FIG. 3 is a plan view showing a conventional folding portable terminal having a hinge connection in its open state.
Figure 4:
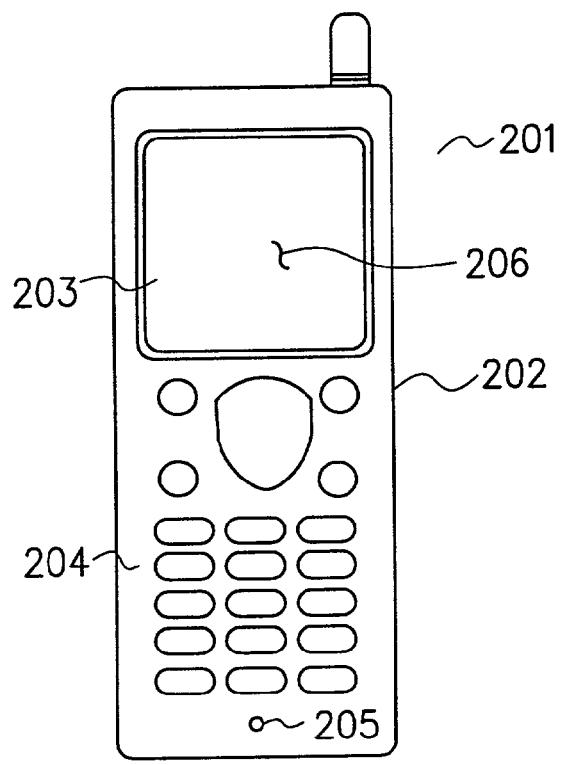
FIG. 4 is a front view of a portable terminal as an electronic device according to an embodiment of the present invention.

FIG. 4 is a front view of a portable terminal as an electronic device according to an embodiment of the present invention. A portable terminal 201 comprises a main body 202, a display/speaker section 203, an operating section 204, and a microphone 205. The display/speaker section 203 is located at the upper part of the front surface of the main body 202. The operating section 204 is disposed beneath the display/speaker section 203, similarly to the conventional portable terminal shown in FIG. 2, and further, the microphone 205 is disposed thereunder. According to this embodiment, as is described above, a display and a speaker are united and form the display/speaker section 203. The display/speaker section 203 is provided with a display cover 206 in front thereof for protecting the surface of its LCD (liquid crystal display).

Figure 5:
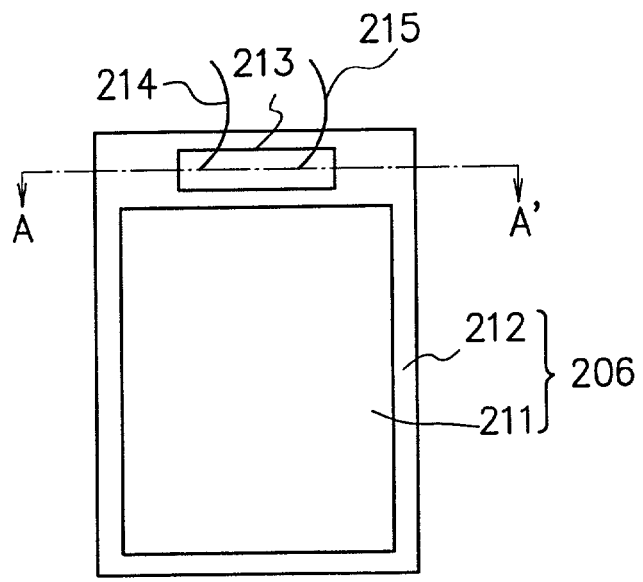
FIG. 5 is a back view of a display cover of the embodiment of FIG. 4.

FIG. 5 is a back view of the display cover. The display cover 206 comprises a transparent part 211 and a colored part 212 that is arranged so as to surround the transparent part 211. The transparent part 211 corresponds to a liquid crystal panel (not shown), and protects the panel from external damages while retaining the display on the panel. The colored part 212 may be made of the same flat sheet material as the transparent part 211, however, it is colored in order to visually distinguish between a display area and other areas on the liquid crystal panel.

The colored part 212 is provided with a drive 213 that vibrates the display cover 206 to output sound. A pair of driving signal wires 214 and 215 extends from the drive 213.

Figure 6:
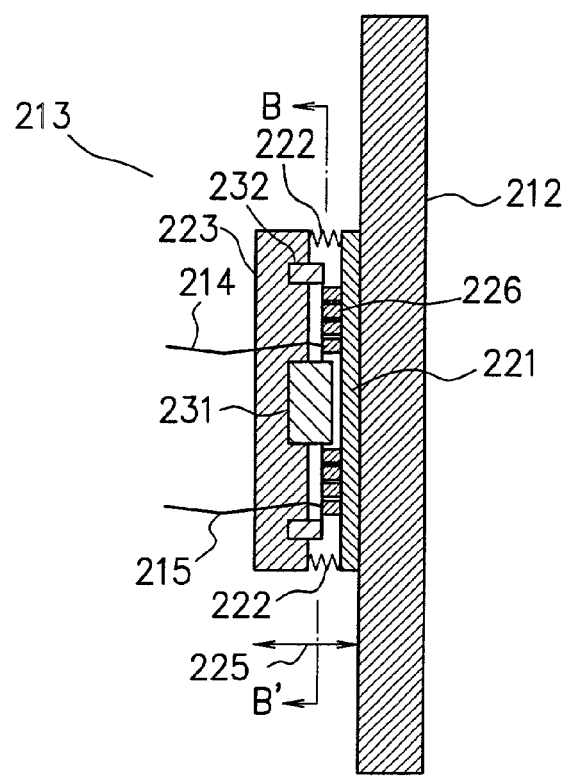
FIG. 6 is across section view of a drive taken along the line A-A' in FIG. 5.

FIG. 6 is a section of the drive 213 taken along the line A-A' in FIG. 5. The drive 213 includes first and second supporting sections 221 and 223, absorbers 222, a planar coil 226, and first and second magnets 231 and 232. The plate supporting section 221 is fixed on the colored part 212, and supports the second supporting section 223 with the absorbers 222. There is a small space left between the first and second supporting sections 221 and 223. The absorbers 222 are made of elastic material, and thereby the second supporting section 223 can reciprocate with respect to the first supporting section 221 in the directions indicated by arrow 225. On the first supporting section 221, the planar coil 226 winding in a spiral is installed.

Figure 7:
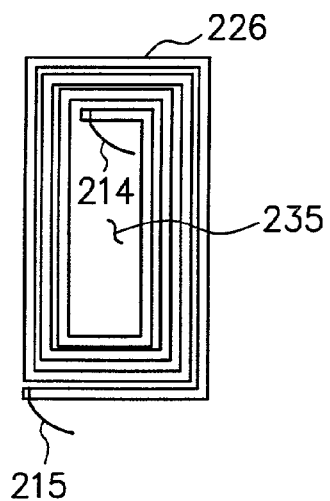
FIG. 7 is a plan view showing a shape of a planar coil of the embodiment.

FIG. 7 illustrates the shape of the planar coil. The planar coil 226 is wound to form a rectangular frame so as to be efficiently disposed on the colored part 212 shown in FIG. 5. Each end of the planar coil 226 is electrically connected to one end of the respective driving signal wires 214 and 215.

FIG. 8 is a section taken along the line B-B' in FIG. 6 showing a physical relationship among the planar coil, the first magnet and the second magnet. The first magnet 231 and the second magnet 232 are located at positions opposed to, but avoiding the planar coil 226 on the second supporting section 223 shown in FIG. 6. The first magnet 231 is located so that its tip fits in a space 235 within the frame of the planar coil 226. The second magnet 232 is arranged a little outside the outmost circumference of the planar coil 226.

Consequently, when an audio signal is applied via a pair of the driving signal wires 214 and 215, a magnetic field is generated in the planar coil 226. Subsequently, the first and second supporting sections 221 and 223 repeatedly come close to and away from each other under the interaction between the magnetic field and magnetic fields of the first and second magnets 231 and 232 according to Fleming's law. Thus the display cover 206 vibrates while resonating.

As is described above, an audio signal outputted from an amplifier (not shown) is applied to the planar coil 226 via the driving signal wires 214 and 215, and thereby sound is outputted from the whole display cover 206. Namely, a portable terminal according to the present invention does not need to have sound output holes for a speaker as well as a speaker provided on the front sure differently from a conventional one.

Incidentally, in the description of this embodiment the second supporting section 223 is supported by the first supporting section 221. Instead, the second supporting section 223 may be fixed on an immobile member (not shown), and the first supporting section 221 may be elastically supported by the absorbers 222.

FIG. 9 illustrates another embodiment of the present invention, and corresponds to FIG. 6 in the above embodiment. In FIG. 9, the like components are designated by the like reference numerals as in FIG. 6, and explanation thereof will be omitted. In this embodiment a planar coil 301 having the same shape as the planar coil 226 shown in FIG. 7 is directly fixed on the colored part 212 as a substitute for the first supporting section 221 shown in FIG. 6.

The planar coil 301 is provided with a plate insulation 302 having a frame shape equal in size to the coil 301 on the surface facing to the second supporting section 223. In addition, the same planar coil 226 in the previous embodiment is installed on the insulation 302 to the surface facing the second supporting section 223. In this manner, two planar coils 301 and 226, and the insulation 302 are installed so as to form the tri-layer structure, and have a space in the center similarly to the previous embodiment. Each end of the planar coil 226 is electrically connected to each end of the planar coil 301 through the insulation 302 by conducting wires 303 and 304. Accordingly, electric current is passed through in the same direction at both planar coils 226 and 301.

As is the case with the previous embodiment, the first and second magnets 231 and 232 are disposed on the second supporting section 223. The structure is identical to that of the previous embodiment. Therefore, in a portable terminal of this embodiment, a stronger magnetic field is produced due to the addition of the planar coil 301 to the planar coil 226. As a result, the display cover 206 vibrates by driving force stronger than that applied in the previous embodiment in relation to the magnets 231 and 232. Thus larger volume of sound is outputted.

While planar coils have three layers with an insulation between them in this embodiment more coils may be added to the layers with interstratifing insulations. Moreover, the coil may be wound around a bobbin disposed perpendicular to the display cover 206. Besides, although the drive part 213 is located at a side of the display cover 206 in the above embodiments, it is a matter of course that a drive may be installed at any position on a display cover. Furthermore, while a description has been given about a portable terminal in the above embodiments, the present invention is naturally applicable to other electronic devices.

As set forth hereinabove, in accordance with the present invention, a transparent plate member provided on the surface of a display vibrates in response to an audio signal to output sound. Consequently, the display can be situated even over the space where a speaker is supposed to be disposed and thus permitting a relatively large display. In addition there is no need to provide a portable terminal with sound output holes for a speaker, and therefore it is possible to improve the damp proof effect.

Moreover, in accordance with an aspect of the present invention, driving means are installed at plural places on the plate member, and therefore it is possible to uprate sound output and reduce accommodation space per a driving means.

Furthermore, in accordance with another aspect of the present invention, plural planar coils are built up in the direction orthogonal to the surface where the coils are installed, and thus enough volume of sound can be outputted.

While the preferred embodiments of the present invention have been described using specific terms, such description is for illustrative purposes only, and it is to be understood that changes and variations may be made without departing from the spirit or the scope of the following claims.

What is claimed is:

1. An electronic device comprising:
   a main body;
   a display disposed on the main body for displaying information;
   a plate member having a transparent central section overlying the display and a colored section adjacent the transparent central section and positioned other than overlying the display; and
   a driving unit connected to the colored section of the plate member for vibrating the plate member to cause the plate member to create a sound in response to an audio signal, the driving unit comprising:
   a planar voice coil;
   a resilient member;
   a support section moveably attached to the colored section of the plate member by said resilient member; and
   a first magnet disposed inside the planar voice coil and a second magnet disposed outside the planar voice coil, wherein the first and second magnets are fixedly attached to the support section.

2. The electronic device as claimed in claim 1, wherein the first and second magnets are installed on the colored, section of the plate member.

3. The electronic device as claimed in claim 2, wherein the planar voice coil comprises a shape of a quadrilateral frame and the first and second magnets are quadrilateral shaped complementary to the shape of the planar voice coil.

4. The electronic device as claimed in claim 2, further comprising a second planar voice coil adjacent the first voice coil in a direction orthogonal to a surface on which the first voice coil is installed.

5. The electronic device as claimed in claim 1, wherein the planar voice coil is installed on the colored section of the plate member.

6. The electronic device as claimed in claim 5, wherein the planar voice coil comprises a shape of a quadrilateral frame and the first and second magnets are quadrilateral shaped complementary to the shape of the planar voice coil.

7. The electronic device as claimed in claim 5, further comprising a second planar voice coil adjacent the first voice coil in the direction orthogonal to a surface of the colored section on which the first voice coil is installed.

8. The electronic device as claimed in claim 1, further comprising a plurality of driving units installed at plural places on the colored section of the plate member.

9. The electronic device as claimed in claim 1, wherein the colored section comprises an edge section circumscribing the transparent central section.

10. The electronic device as claimed in claim 1, wherein the planar voice coil is fixedly attached to the colored section of the plate member.

* * * * *